US012658709B2

(12) United States Patent
Ku et al.

(10) Patent No.: US 12,658,709 B2
(45) Date of Patent: Jun. 16, 2026

(54) POWER SUPPLYING SYSTEM AND POWER SUPPLY ADJUSTMENT METHOD

(71) Applicant: SENAO NETWORKS, INC., Taoyuan (TW)

(72) Inventors: Pi Kuang Ku, Taoyuan (TW); Po Yueh Wu, Taoyuan (TW); Chia Cheng Hou, Taoyuan (TW)

(73) Assignee: SENAO NETWORKS, INC., Taoyuan (TW)

( * ) Notice: Subject to any disclaimer, the term of this patent is extended or adjusted under 35 U.S.C. 154(b) by 0 days.

(21) Appl. No.: 19/006,423

(22) Filed: Dec. 31, 2024

(65) Prior Publication Data

US 2026/0025002 A1 Jan. 22, 2026

(30) Foreign Application Priority Data

Jul. 22, 2024 (TW) .................................. 113127318

(51) Int. Cl.
*H02J 3/38* (2026.01)
*H02J 3/12* (2006.01)

(52) U.S. Cl.
CPC . *H02J 3/38* (2013.01); *H02J 3/12* (2013.01)

(58) Field of Classification Search
CPC ...................................... H02J 3/38; H02J 3/12
See application file for complete search history.

(56) References Cited

U.S. PATENT DOCUMENTS

2023/0336001 A1 10/2023 Tsai et al.

FOREIGN PATENT DOCUMENTS

EP 2773063 A1 * 9/2014 ............. H04L 12/10
TW 202343929 A 11/2023

OTHER PUBLICATIONS

Taiwan Patent Office, "Office Action", Aug. 29, 2025, Taiwan.

* cited by examiner

*Primary Examiner* — Robert L Deberadinis
(74) *Attorney, Agent, or Firm* — Troutman Pepper Locke LLP; Tim Tingkang Xia, Esq.

(57) ABSTRACT

A power supplying system and a power supply adjustment method are provided. The power supplying system includes a plurality of power suppliers. Each power supplier is connected to a power source respectively, and the power suppliers are connected to a load and a bus together. Each power supplier includes a current equalizer and a voltage converter electrically connected with the current equalizer. Each current equalizer generates a voltage conversion signal according to at least an output power information and an output current of the corresponding power supplier. Each current equalizer generates a voltage adjustment signal according to the voltage conversion signal, other voltage conversion signals which are received by the bus from other current equalizers, and an output voltage provided to the load by the corresponding power supplier. Each voltage converter adjusts an input voltage of the corresponding power source according to the voltage adjustment signal.

12 Claims, 3 Drawing Sheets

1

POWER SUPPLYING SYSTEM AND POWER SUPPLY ADJUSTMENT METHOD

CROSS-REFERENCES TO RELATED APPLICATIONS

This application claims priority to Taiwan Patent Application No. 113127318 filed on Jul. 22, 2024.

BACKGROUND OF THE INVENTION

Field of the Invention

The present invention relates to a power supplying system and a power supply adjustment method. More specifically, the present invention relates to a power supplying system which can adjust output powers of a plurality of power suppliers and a power supply adjusting method.

Descriptions of the Related Art

After the publication of the power supply standard for power over ethernet (POE) of IEEE 802.3bt, many network switches and related apparatuses that require a high power (more than 1050 watts) have been introduced one after another. In order to meet high power requirements of these network switches or apparatuses, it is often necessary to use multiple power suppliers to provide the power they need. However, in fact, a sum of rated/actual output powers of multiple power suppliers may be higher than a power required by a load (i.e., the aforesaid network switches and related apparatuses that require the high power), which leads to energy waste. For example, if the power required by a network switch is 3000 watts (W) but the rated/actual output powers of two power suppliers used are both 2000 watts, then there will be 1000 watts of energy waste since the rated/actual output powers provided by the two power suppliers are 4000 watts. Accordingly, an urgent need exists in the art to improve the energy waste.

SUMMARY OF THE INVENTION

In order to solve at least the above problems, the present invention provides a power supplying system. The power supplying system may include a plurality of power suppliers, which are connected to a plurality of power sources respectively and are connected to a load and a bus together. Each power supplier among the plurality of power suppliers includes: a current equalizer, being configured to generate a voltage conversion signal according to at least an output power information and an output current of the corresponding power supplier, transmit the voltage conversion signal to other current equalizers through the bus, and receive other voltage conversion signals generated by other current equalizers through the bus; and generate a voltage adjustment signal according to the voltage conversion signal generated by the current equalizer, the other voltage conversion signals generated by the other current equalizers and an output voltage provided to the load by the corresponding power supplier; and a voltage converter, being electrically connected with the current equalizer and being configured to adjust an input voltage of the corresponding power source according to the voltage adjustment signal.

In order to solve at least the above problems, the present invention further provides a power supply adjustment method for a plurality of power suppliers. The power suppliers are connected to a plurality of power sources respectively and are connected to a load and a bus together. Each power supplier among the plurality of power suppliers includes: a current equalizer, being configured to generate a voltage conversion signal according to at least an output power information and an output current of the corresponding power supplier, transmit the voltage conversion signal to other current equalizers through the bus, receive other voltage conversion signals generated by other current equalizers through the bus, and generate a voltage adjustment signal according to the voltage conversion signal generated by the current equalizer, the other voltage conversion signals generated by the other current equalizers and an output voltage provided to the load by the corresponding power supplier; and a voltage converter, being electrically connected with the current equalizer, and being configured to adjust an input voltage of the corresponding power source according to the voltage adjustment signal.

As described above, in the power supplying system and the power supply adjustment method provided according to the present invention, the input voltage provided to the load by each of the power suppliers is adjusted through each of the current equalizers, the bus and each of the voltage converters so that the power output to the load by the power supplier is adjusted. In this way, a sum of actual output powers of all the power suppliers meets but does not exceed the power required by the load. Therefore, the present invention indeed can effectively solve the above problems.

What described above are not intended to limit the present invention, but only generally describe the technical problems that can be solved by the present invention, the technical means that can be adopted by the present invention and the technical effects that can be achieved by the present invention so as to provide preliminary appreciation of the present invention by those of ordinary skill in the art. According to the attached drawings and the contents described in the following embodiments, those of ordinary skill in the art can further appreciate the details of various embodiments of the present invention.

DESCRIPTION OF THE PREFERRED EMBODIMENT

Figure 1:
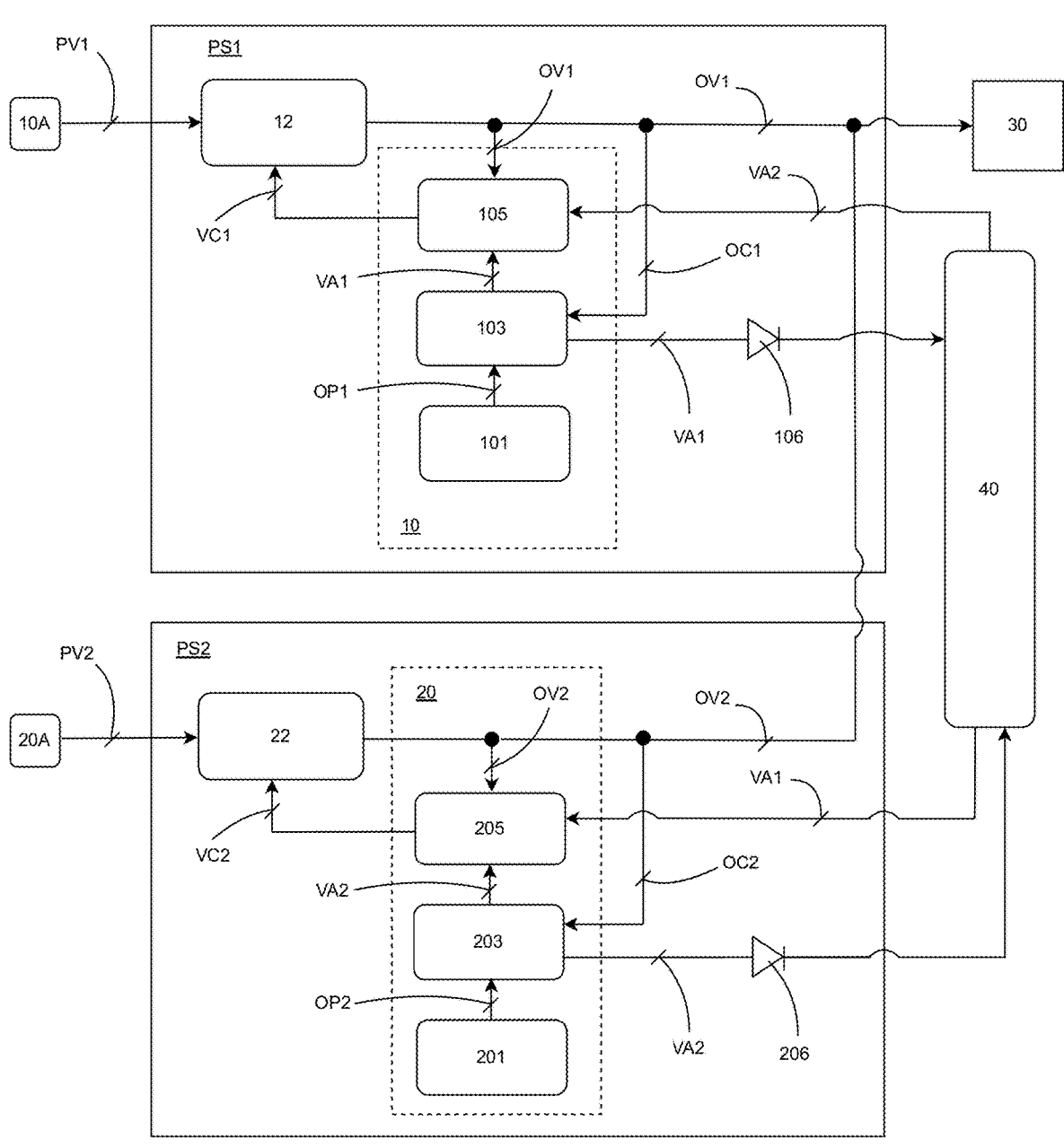
FIG. 1 illustrates a schematic view of an architecture of a power supplying system according to the present invention.

Hereinafter, the present invention will be described with reference to a number of embodiments. However, these embodiments are not intended to limit the present invention to be implemented only according to operations, environment, applications, structures, flow processes or steps described herein. Elements unrelated to the present invention are omitted from depiction, but may be implied in the attached drawings. In the attached drawings, dimensions of and dimensional scales among individual elements are provided only for illustration, and are not intended to limit the present invention. Unless otherwise specified, in the following description, the same (or similar) reference numerals may correspond to the same (or similar) elements. Unless otherwise specified, the number of respective elements described below may be one or more while being implementable.

Terms used in this disclosure are only for describing the embodiments and are not intended to limit the present invention. Unless clearly indicated otherwise in the context, the singular form "a/an/one" is intended to include the plural form as well. Terms such as "including" and "comprising" indicate the presence of features, integers, steps, operations, elements and/or components described herein, but do not exclude the presence of one or more other features, integers, steps, operations, elements, components and/or combinations thereof. The term "and/or" includes any and all combinations of one or more related items listed.

FIG. 1 illustrates a schematic view of an architecture of a power supplying system according to the present invention. The content shown in FIG. 1 is only for illustrating some embodiments of the network power supplying system according to the present invention, and is not intended to limit the scope claimed for the present invention.

As shown in FIG. 1, in some embodiments of the present invention, a power supplying system 1 basically includes a plurality of power suppliers, such as but not limited to a power supplier PS1 and a power supplier PS2. The power supplier PS1 is connected to a power source 10A, while the power supplier PS2 is connected to a power source 20A, and the power supplier PS1 and the power supplier PS2 are connected to the same load 30 together. Furthermore, the power supplier PS1 includes a current equalizer 10 and a voltage converter 12, and the current equalizer 10 is electrically connected to the voltage converter 12. Similarly, the power supplier PS2 includes a current equalizer 20 and a voltage converter 22, and the current equalizer 20 is electrically connected to the voltage converter 22. In addition, the current equalizer 10 is configured to generate a voltage adjustment signal VC1 according to at least an output power information OP1 of the power supplier PS1 and an output current OC1 of the power supplier PS1, and the output power information OP1 includes an output power corresponding to the power supplier PS1. Moreover, the voltage converter 12 is configured to convert an input voltage PV1 of the power source 10A into an output voltage OV1 provided to the load 30 according to the voltage adjustment signal VC1.

Similarly, the current equalizer 20 is configured to generate a voltage adjustment signal VC2 according to at least an output power information OP2 of the power supplier PS2 and an output current OC2 of the power supplier PS2, and the output power information OP2 includes an output power corresponding to the power supplier PS2. Moreover, the voltage converter 22 is configured to convert an input voltage PV2 of the power source 20A into an output voltage OV2 provided to the load 30 according to the voltage adjustment signal VC2.

In some embodiments, the current equalizer 10 of the power supplier PS1 may include a power information providing module 101, a current amplification module 103 and a voltage adjustment module 105. The power information providing module 101 is configured to store and provide information related to the output power information OP1 of the power supplier PS1, such as but not limited to a power of the output power information OP1, a rated output voltage value corresponding to the power, and the like. For example, when the output power information OP1 of the power supplier PS1 is 1000 watts, the power information providing module 101 may store and provide such power value and/or the rated output voltage value (e.g., 1 volt) corresponding to the power value and other information.

Similarly, the current equalizer 20 of the power supplier PS2 may include a power information providing module 201, a current amplification module 203 and a voltage adjustment module 205. The power information providing module 201 is configured to store and provide information related to the output power information OP2 of the power supplier PS2, such as but not limited to a power of the output power information OP2, a rated output voltage value corresponding to the power, and the like.

The current amplification module 103 is electrically connected with the voltage adjustment module 105 and a bus 40, and the bus 40 is arranged between the corresponding power suppliers PS1 and PS2. Further speaking, the bus 40 may be arranged inside or outside the power supplier PS1 and the power supplier PS2, or arranged inside the current equalizer 10 and the current equalizer 20. The power information providing module 101 provides the stored information of the output power information OP1 (i.e., the aforesaid information such as the rated output voltage value) to the current amplification module 103, and the current amplification module 103 will know the information, such as but not limited to a rated current value, of the output current OC1 of the power supplier PS1 after detecting the output current OC1 of the power supplier PS1. Then, the current amplification module 103 generates a voltage conversion signal VA1 according to the information of the output power information OP1 and the information of the output current OC1. Moreover, the current amplification module 103 transmits the voltage conversion signal VA1 to the voltage adjustment module 205 of another power supplier PS2 through the bus 40, so that the voltage magnitude of the power supplier PS1 can be known by the voltage adjustment module 205.

Similarly, the current amplification module 203 is electrically connected with the voltage adjustment module 205 and the bus 40. The power information providing module 201 provides the stored information of the output power information OP2 to the current amplification module 203, and the current amplification module 203 will know the information of the output current OC2 of the power supplier PS2 after detecting the output current OC2 of the power supplier PS2. Then, the current amplification module 203 generates a voltage conversion signal VA2 according to the information of the output power information OP2 and the information of the output current OC2. Moreover, the current amplification module 203 transmits the voltage conversion signal VA2 to the voltage adjustment module 105 of another power supplier PS1 through the bus 40, so that the voltage magnitude of the power supplier PS2 can be known by the voltage adjustment module 105. In other words, the power supplier PS1 and the power supplier PS2 can know the voltage magnitudes of each other through the current equalizer 10 and the current equalizer 20.

Specifically, the voltage adjustment module 105 will know the information, such as but not limited to the rated voltage value, of the output voltage OV1 of the power supplier PS1 after detecting the output voltage OV1 of the power supplier PS1. Then, the voltage adjustment module 105 generates the voltage adjustment signal VC1 according to the output voltage OV1, the voltage conversion signal VA1 and the voltage conversion signal VA2 sent by the current amplification module 203. Similarly, the voltage adjustment module 205 will know the information of the output voltage OV2 of the power supplier PS2 after detecting the output voltage OV2 of the power supplier PS2, and then the voltage adjustment module 205 generates the voltage adjustment signal VC2 according to the output voltage OV2, the voltage conversion signal VA2 and the voltage conversion signal VA1 sent by the current amplification module 103.

The voltage adjustment module 105 receives the voltage conversion signal VA1 of the current amplification module 103 and the voltage conversion signal VA2 of the current amplification module 203, then the voltage adjustment module 105 can determine whether the voltage value of the power supplier PS2 is greater or less than that of the power supplier PS1. Similarly, the voltage adjustment module 205 receives the voltage conversion signal VA2 of the current amplification module 203 and the voltage conversion signal VA1 of the current amplification module 103, then the voltage adjustment module 205 can determine whether the voltage value of the power supplier PS1 is greater or less than that of the power supplier PS2. In addition, after determining the voltage values of the power supplier PS1 and the power supplier PS2, the voltage adjustment module 105 and the voltage adjustment module 205 can then determine the voltage values to be adjusted by the voltage converter 12 and the voltage converter 22 depending on the requirements of the load 30.

In other words, for the power supplier PS1, the current amplification module 103 in the current equalizer 10 can detect the output current OC1 at any time, and the current amplification module 103 can transmit the voltage conversion signal VA1 to the voltage adjustment module 205 through the bus 40 and meanwhile transmit the voltage conversion signal VA1 to the voltage adjustment module 105. At this time, the voltage adjustment module 105 can determine the voltage magnitudes of the voltage conversion signal VA1 and the voltage conversion signal VA2, and the voltage adjustment module 105 can detect the output voltage OV1 at any time. Then, the voltage adjustment module 105 determines the voltage values to be adjusted so as to generate the voltage adjustment signal VC1 according to the output voltage OV1, the voltage conversion signal VA1 and the voltage conversion signal VA2 sent by the current amplification module 203 and based on the requirements of the load 30.

Similarly, for the power supplier PS2, the current amplification module 203 in the current equalizer 20 can detect the output current OC2 at any time, and the current amplification module 203 can transmit the voltage conversion signal VA2 to the voltage adjustment module 105 through the bus 40 and meanwhile transmit the voltage conversion signal VA2 to the voltage adjustment module 205. At this time, the voltage adjustment module 205 can determine the voltage magnitudes of the voltage conversion signal VA1 and the voltage conversion signal VA2, and the voltage adjustment module 205 can detect the output voltage OV2 at any time. Then, the voltage adjustment module 205 determines the voltage values to be adjusted so as to generate the voltage adjustment signal VC2 according to the output voltage OV2, the voltage conversion signal VA2 and the voltage conversion signal VA1 sent by the current amplification module 103 and based on the requirements of the load 30. Accordingly, the voltage converter 12 can adjust the output voltage OV1 according to the voltage adjustment signal VC1, and the voltage converter 22 can adjust the output voltage OV2 according to the voltage adjustment signal VC2, so as to achieve the power required by the load 30.

From the above description, when a total output power of the power supplier PS1 and the power supplier PS2 in the power supplying system 1 is greater than the power required by the load 30, conditions of the power source 10A and the power source 20A at all stages can be detected periodically or aperiodically through the current equalizer 10 and the current equalizer 20. According to these detection results, the output voltages of the two power suppliers PS1 and PS2 whose output powers are the same or different are determined so that these output voltages can be adjusted in proportion according to the power required by the load 30. In this way, the output power of each of the power suppliers with different input powers is adjusted to the power required by the load 30.

In some embodiments, the power supplier PS1 includes a diode 106 electrically connected with the current amplification module 103 and the bus 40, while the power supplier PS2 includes a diode 206 electrically connected with the current amplification module 203 and the bus 40, so as to isolate low-voltage power sources. For example, if the output power of the power supplier PS1 is 2000 W (at a voltage of 100-120V, i.e., a low voltage), and the output power of the power supplier PS2 is 4000 W (at a voltage of 200-240V, i.e., a high voltage), then the information 2000 W of the output power information OP1 is provided to the current amplification module 103 by the power information providing module 101, and the current amplification module 103 generates the voltage conversion signal VA1 at the low voltage (100-120V), but the voltage conversion signal VA1 at the low voltage will be isolated and filtered by the diode 106 and will not be transmitted to the bus 40. In addition, the information 4000 W of the output power information OP2 is provided to the current amplification module 203 by the power information providing module 201, and then the voltage conversion signal VA2 at the high voltage (200-240V) generated by the current amplification module 203 will directly pass through the diode 206 and be transmitted to the bus 40, and then transmitted to the voltage adjustment module 105 through the bus 40.

After receiving the voltage conversion signal VA2 at the high voltage and the voltage conversion signal VA1 at the low voltage provided by the current amplification module 103 simultaneously, the voltage adjustment module 105 can determine the voltage magnitudes of the voltage conversion signal VA1 and the voltage conversion signal VA2. Then, the voltage adjustment module 105 determines the voltage values to be adjusted so as to generate the voltage adjustment signal VC2 according to the output voltage OV1, the voltage conversion signal VA1 and the voltage conversion signal VA2 sent by the current amplification module 203 and based on the requirements of the load 30. Then, the voltage converter 12 will adjust the output voltage OV1 to be consistent with the output voltage OV2 after receiving the voltage adjustment signal VC2. Because the current amplification module 103 detects the output current OC1 at any time and the output current OC1 changes when the output voltage OV1 changes, the voltage conversion signal VA1 at the low voltage originally provided by the current amplification module 103 will become the voltage conversion signal VA1 at the high voltage, and this voltage conversion signal VA1 at the high voltage will not be isolated and filtered by the diode 106 and will be transmitted to the voltage adjustment module 205 through the bus 40, so as to achieve the purpose of current equalizing.

In some embodiments, the current amplification modules 103 and 203 of the current equalizers 10 and 20 can generate voltage conversion signals VA1 and VA2 respectively according to the following equation, and the corresponding voltage converters 12 and 22 can adjust the input voltages PV1 and PV2 of the corresponding power sources 10A and 20A to the output voltages OV1 and OV2 provided to the load 30 respectively according to the voltage conversion signals VA1 and VA2.

$$VLS = \text{Gain\_Pb} \times I_o \qquad \text{(Equation 1)}$$

Wherein, VLS is the output signals (corresponding to the voltage conversion signals VA1 and VA2) of the current amplification modules 103 and 203, Io is the output currents (corresponding to the output currents OC1 and OC2) of the power suppliers PS1 and PS2, and Gain_Pb (power gain) is a parameter, which is expressed as $$\text{Gain\_Pb} = \frac{\text{Po\_max}}{\text{Po\_min} \times 100},$$

calculated according to the output power information OP1 and OP2 provided by the output power information providing modules 101 and 201, where Po_max represents the maximum output power of the same series of power suppliers and Po_min represents the minimum output power of the same series of power suppliers.

For example, if the power required by the load 30 is 3000 W, the original output power of the power supplier PS1 is 2000 W, the original output power of the power supplier PS2 is 4000 W, the maximum output power of the same series of power suppliers is 10000 W, the minimum output power of the same series of power suppliers is 2000 W, and the output voltages of the power supplier PS1 and the power supplier PS2 are both 100V, then in this exemplary example, for both the power suppliers PS1 and PS2, Gain_Pb is 0.05 (i.e., 10000 W/(2000 W×100)) according to Equation 1. Moreover, the voltage conversion signal VA1 may be expressed as VA1=0.05×OC1, while the voltage conversion signal VA2 may be expressed as VA2=0.05×OC2. In addition, since the power required by the load 30 is 3000 W, the current required by the load 30 is 30 A (3000 W/100V), which is provided by the output current OC1 of the power supplier PS1 and the output current OC2 of the second power supplier PS2 (i.e., OC1+OC2=30 A).

The voltage adjustment modules 105 and 205 continuously adjust the voltage converters 12 and 22 based on the voltage conversion signals VA1 and VA2, respectively, until VA1=VA2 (reaching a steady state). The larger the values of the voltage conversion signals VA1 and VA2 are, the higher the voltage values of the output voltages OV1 and OV2 of the voltage adjustment modules 105 and 205 will be. When VA1=VA2, in order to satisfy both conditions of 0.05× OC1=0.05×OC2 and OC1+OC2=30 A, it can be calculated that the output current OC1 and the output current OC2 are both 15 A, and the voltage conversion signal VA1 and the voltage conversion signal VA2 are both 0.75 (i.e., 0.05×15 A) at this time. When VA1=VA2=0.75, the output power of the power supplier PS1 will be adjusted from 2000 W to 1500 W (calculated by the product of the output voltage of the power supplier PS1 and the output current OC1 at this time, i.e., 100V×15 A), and the output power of the power supplier PS2 will be adjusted from 4000 W to 1500 W (calculated by the product of the output voltage of the power supplier PS2 and the output current OC2 at this time, i.e., 100V×15 A), so as to provide 3000 W (i.e., 1500 W+1500 W) required by the load 30 together. At this time, the output power of the power supplier PS1 will be reduced to 75% of the original 2000 W, while the output power of the power supplier PS2 will be reduced to 37.5% of the original 4000 W.

Figure 2:
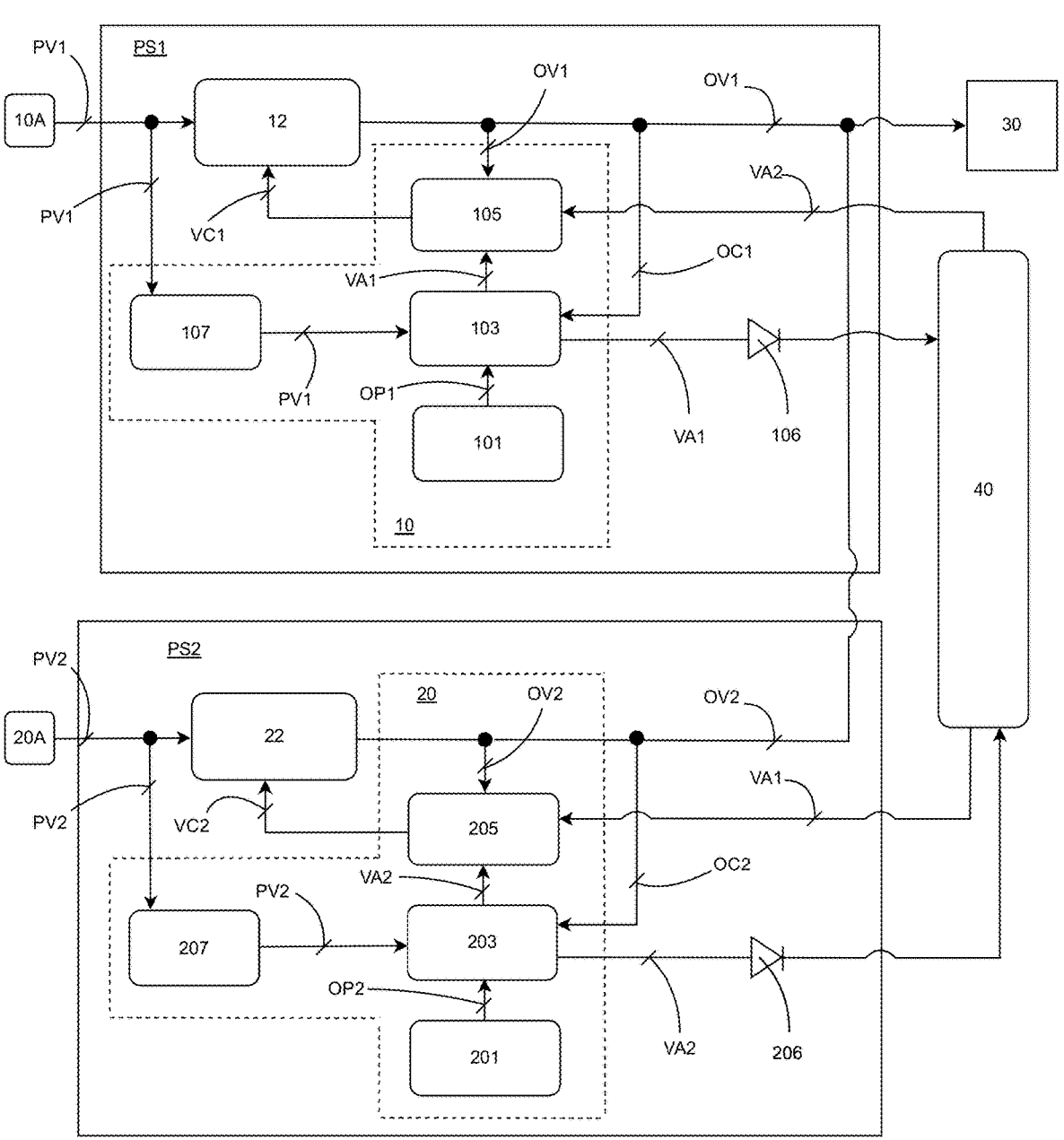
FIG. 2 illustrates a schematic view of another architecture of a power supplying system according to the present invention.

Next referring to FIG. 2, in some embodiments of the present invention, a current equalizer 10 of a power supplying system 2 further includes a voltage detection module 107, and a current equalizer 20 further includes a voltage detection module 207. After detecting an input voltage PV1 of a power supplier PS1, the voltage detection module 107 knows information of the input voltage PV1 of the power supplier PS1, such as but not limited to a rated voltage value. Then, the voltage detection module 107 transmits the information of the input voltage PV1 to a current amplification module 103, and the current amplification module 103 generates a voltage conversion signal VA1 according to the input voltage PV1, an output power information OP1 and the information of an output current OC1. Similarly, after detecting an input voltage PV2 of a power supplier PS2, the voltage detection module 207 knows information of the input voltage PV2 of the power supplier PS2. Then, the voltage detection module 207 transmits the information of the input voltage PV2 to the current amplification module 203, and the current amplification module 203 generates a voltage conversion signal VA2 according to the input voltage PV2, an output power information OP2 and the information of an output current OC2.

The power supplying system 2 is different from the power supplying system 1 in that when output powers of the power supplier PS1 and the power supplier PS2 are inconsistent, the input voltage PV1 of the power supplier PS1 and the input voltage PV2 of the power supplier PS2 can be detected periodically or aperiodically by the voltage detection modules 107 and 207, respectively. Therefore, when the input voltages of the power supplier PS1 and the power supplier PS2 are different or the power suppliers PS1 and PS2 assume different powers under a high voltage input or a low voltage input, the voltage detection module 107 and the voltage detection module 207 can detect the current input voltage PV1 and the input voltage PV2 at any time, so that the input voltage PV1 and the input voltage PV2 can be adjusted to the power required by the load 30 through the voltage converter 12 and the voltage converter 22 at any time.

In some embodiments, current amplification modules 103 and 203 of the current equalizers 10 and 20 can generate voltage conversion signals VA1 and VA2 respectively according to the following equation, and the corresponding voltage converters 12 and 22 can adjust the input voltages PV1 and PV2 of the corresponding power sources 10A and 20A to the output voltages OV1 and OV2 provided to the load 30 according to the voltage conversion signals VA1 and VA2.

$$VLS = \frac{\text{Gain\_Pa}}{\text{Gain\_Pb}} \times I_0 \qquad \text{(Equation 2)}$$

Wherein, VLS is the output signals (corresponding to the voltage conversion signals VA1 and VA2) of the current amplification modules 103 and 203; Gain_Pa (power gain) is a parameter, which is expressed as $$\text{Gain}_{Pa} = \frac{Po}{\text{Po\_min}},$$

calculated according to the input voltages PV1 and PV2 detected by the voltage detection modules 107 and 207, while Gain_Pb (power gain) is a parameter, which is expressed as $$\text{Gain}_{Pb} = \frac{\text{Po\_max}}{\text{Po\_min} \times 100},$$

calculated according to the output power information OP1 and OP2 provided by the output power information providing modules 101 and 201, where Po represents the output power of each of the power suppliers, Po_max represents the maximum output power of the same series of power suppliers, and Po_min represents the minimum output power of the same series of power suppliers.

For example, if the power required by the load 30 is 3000 W, the original output power of the power supplier PS1 is 2000 W (indicating that the input voltage PV1 of the power supplier PS1 is a low voltage, e.g., 100~120 VAC), the original output power of the power supplier PS2 is 4000 W (indicating that the input voltage PV2 of the power supplier PS2 is a high voltage, e.g., 200~240 VAC), the maximum output power of the same series of power suppliers is 10000 W, the minimum output power of the same series of power suppliers is 2000 W, and the output voltage of the power supplier PS1 and the output voltage of the power supplier PS2 are both 100V, then in this exemplary example, for the power supplier PS1, Gain_Pa=1 (i.e., 2000 W/2000 W) and Gain_Pb=0.05 (i.e., 10000 W/(2000 W×100)), while for the power supplier PS2, Gain_Pa=2 (i.e., 4000 W/2000 W) and Gain_Pb=0.05 (i.e., 10000 W/(2000 W×100)) according to Equation 2. Moreover, the voltage conversion signal VA1 may be expressed as VA1=0.05×OC1, and the voltage conversion signal VA2 may be expressed as VA2=0.025× OC2. In addition, since the power required by the load 30 is 3000 W, the current required by the load 30 is 30 A (3000 W/100V), which is provided by the output current OC1 of the power supplier PS1 and the output current OC2 of the second power supplier PS2 (i.e., OC1+OC2=30 A).

The voltage adjustment modules 105 and 205 continuously adjust the voltage converters 12 and 22 based on the voltage conversion signals VA1 and VA2, respectively, until VA1=VA2 (reaching a steady state), and the larger the values of the voltage conversion signals VA1 and VA2 are, the higher the voltage values of the output voltages OV1 and OV2 of the voltage adjustment modules 105 and 205 will be. When VA1=VA2, in order to satisfy both conditions of 0.05×OC1=0.025×OC2 and OC1+OC2=30 A, it can be calculated that the output current OC1 and the output current OC2 are 10 A and 20 A respectively, and the voltage conversion signal VA1 and the voltage conversion signal VA2 are both 0.5 (i.e., 0.05×10 A and 0.025×20 A) at this time. When VA1=VA2=0.5, the output power of the power supplier PS1 will be adjusted from 2000 W to 1000 W (calculated by the product of the output voltage of the power supplier PS1 and the output current OC1 at this time, i.e., 100V×10 A), and the output power of the power supplier PS2 will be adjusted from 4000 W to 2000 W (calculated by the product of the output voltage of the power supplier PS2 and the output current OC2 at this time, i.e., 100V×20 A), so as to provide 3000 W (i.e., 1000 W+2000 W) required by the load 30. At this time, the output power of the power supplier PS1 will be reduced to 50% of the original 2000 W, and the output power of the power supplier PS2 will also be reduced to 50% of the original 4000 W.

As described above, the output power of each of the power suppliers PS1 and PS2 is adjusted according to the required power provided to the load 30 by the current equalizers 10 and 20 and the voltage converters 12 and 22 according to the present invention, so that actual output powers of all the power suppliers meet the power required by the load 30. In this way, redundant power loss in the power supplying systems 1 and 2 can be saved. Moreover, the problem of high temperature caused by the power supplier with the low power can also be effectively avoided.

In addition, in some embodiments of the present invention, the input voltages PV1 and PV2 of the power sources 10A and 20A will affect the output voltages OV1 and OV2 of the power suppliers PS1 and PS2, and thus when the power supply efficiency and voltage change randomly (e.g., in the case of solar power generation, the power supply efficiency will change according to different sunshine amounts due to different seasons and climate temperatures), the output voltages OV1 and OV2 will change accordingly. By detecting the input voltages PV1 and PV2 at any time through the voltage detection modules 107 and 207 of the power supplying system 2, the actual output powers and the output voltages OV1 and OV2 of the power suppliers PS1 and PS2 at this time can be known, and then the power suppliers PS1 and PS2 can be adjusted to meet the power required by the load 30.

It shall be additionally noted that, current equalizing lines of the power supplying systems 1 and 2 according to the present invention are not limited to be adjusted in an analog manner, but may also be adjusted in a digital manner.

Figure 3:
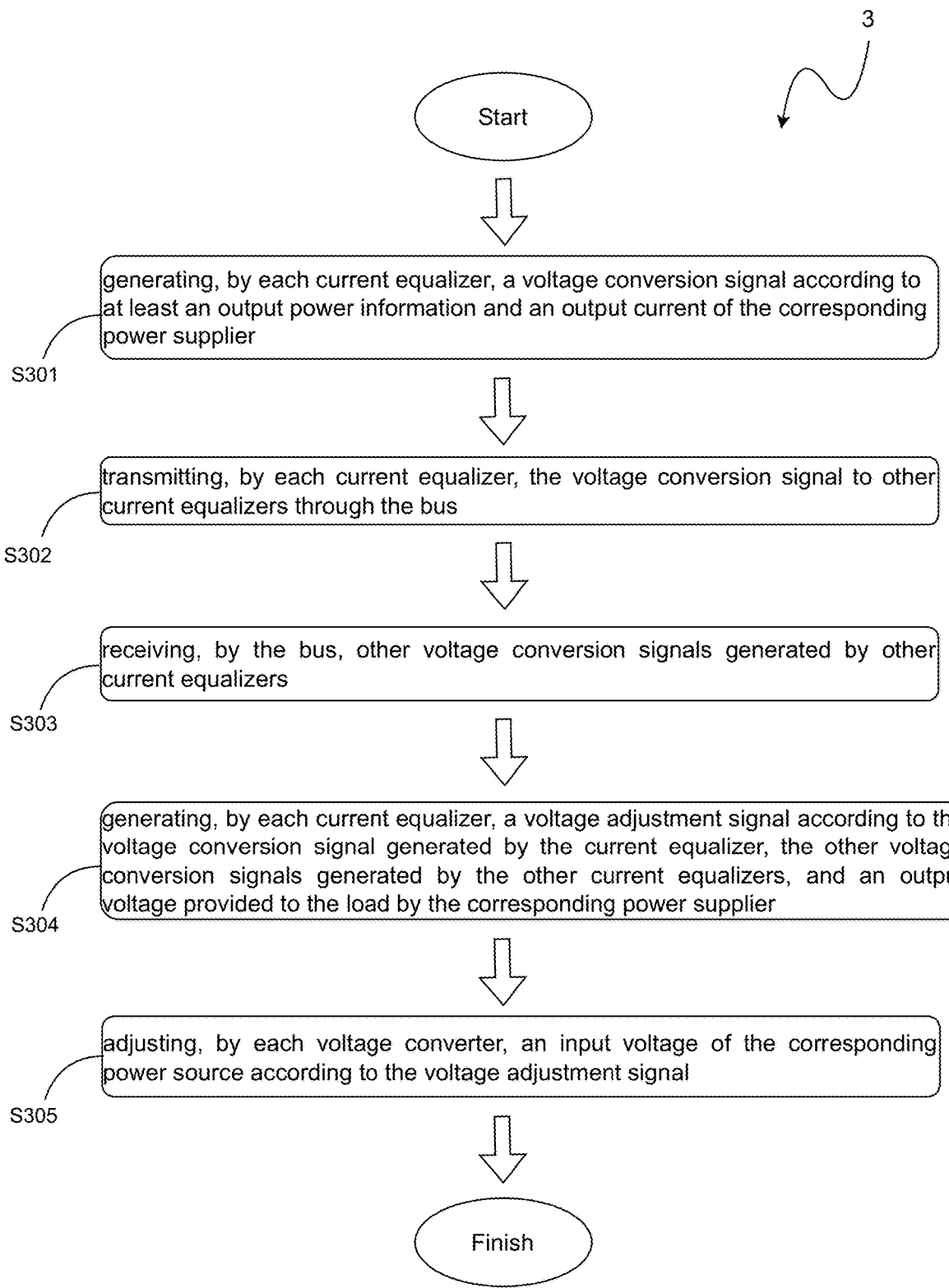
FIG. 3 illustrates a flowchart diagram of a power supply adjustment method according to the present invention.

FIG. 3 illustrates a flowchart diagram of a power supply adjustment method (hereinafter referred to as "a power supply adjustment method 3") for a plurality of power suppliers according to some embodiments of the present invention. The content shown in FIG. 3 is only for illustrating embodiments of the present invention, and is not intended to limit the scope claimed for the present invention.

Referring to FIG. 3, a power supply adjustment method which is suitable for a power supplying system is provided. The power supplying system includes a plurality of power suppliers, which are connected to a plurality of power sources respectively and are connected to a load and a bus together. Each of the plurality of power suppliers includes a current equalizer and a voltage converter. The power supply adjustment method 3 may include the following steps: generating, by each current equalizer, a voltage conversion signal according to at least an output power information and an output current of the corresponding power supplier (step 301); transmitting, by each current equalizer, the voltage conversion signal to other current equalizers through the bus (step 302); receiving, by the bus, other voltage conversion signals generated by other current equalizers (step 303); generating, by each current equalizer, a voltage adjustment signal according to the voltage conversion signal generated by the current equalizer, the other voltage conversion signals generated by the other current equalizers, and an output voltage provided to the load by the corresponding power supplier (step 304); and adjusting, by each voltage converter, an input voltage of the corresponding power source according to the voltage adjustment signal (step 305).

In some embodiments of the power supply adjustment method 3, each current equalizer generates the voltage conversion signal according to an input voltage of the corresponding power sources, the output power of the corresponding power supplier, and the output current of the corresponding power supplier.

In some embodiments of the power supply adjustment method 3, input voltages of the plurality of power sources are different.

In some embodiments of the power supply adjustment method 3, output powers of the plurality of power suppliers are different.

In some embodiments of the power supply adjustment method 3, a sum of the output powers of the plurality of power suppliers is greater than a required power of the load.

Each embodiment of the power supply adjustment method 3 basically corresponds to a certain embodiment of the power supplying system 1. Therefore, all the corresponding embodiments of the power supply adjustment method 3 can be fully appreciated and realized by those of ordinary skill in the art simply with reference to the above description of the power supplying system 1, even though not all the embodiments of the power supply adjustment method 3 are described in detail above.

The above embodiments are only examples for illustrating the present invention, and are not intended to limit the scope claimed for the present invention. Any other embodiments produced by modifying, changing, adjusting and integrating the above-mentioned embodiments shall all be included in the scope claimed for the present invention as long as they are not difficult for those of ordinary skill in the art to contemplate. The scope claimed for the present invention shall be governed by the claims.

What is claimed is:

1. A power supplying system, comprising:
a plurality of power suppliers, being connected to a plurality of power sources respectively and being connected to a load and a bus together, wherein each of the power suppliers includes:
 a current equalizer, being configured to:
  generate a voltage conversion signal according to at least an output power information and an output current of the corresponding power supplier;
  transmit the voltage conversion signal to other current equalizers through the bus, and receive other voltage conversion signals generated by other current equalizers through the bus; and
  generate a voltage adjustment signal according to the voltage conversion signal generated by the current equalizer, the other voltage conversion signals generated by the other current equalizers, and an output voltage provided to the load by the corresponding power supplier; and
 a voltage converter, being electrically connected with the current equalizer, and being configured to adjust an input voltage of the corresponding power source according to the voltage adjustment signal.

2. The power supplying system according to claim 1, wherein the current equalizer of each of the power suppliers further includes:
a power information providing module, being configured to provide the output power information of the corresponding power supplier;
a current amplification module, being electrically connected with the power information providing module and the bus, and being configured to:
 detect the output current of the corresponding power supplier; and
 generate the voltage conversion signal according to a power gain converted from the output power information of the corresponding power supplier and the output current of the corresponding power supplier;

a voltage adjustment module, being electrically connected with the current amplification module and the bus, and being configured to:
  detect the output voltage provided to the load by the corresponding power supplier;
  receive the other voltage conversion signals generated by the other current equalizers of the power suppliers through the bus; and
  generate the voltage adjustment signal according to the detected output voltage, the voltage conversion signal generated by the current amplification module and the other voltage conversion signals generated by the other current equalizers of the power suppliers.

3. The power supplying system according to claim 1, wherein each current equalizer generates the voltage conversion signal according to the input voltage of the corresponding power source, the output power information of the corresponding power supplier, and the output current of the corresponding power supplier.

4. The power supplying system according to claim 3, wherein the current equalizer of each of the power suppliers further includes:
a voltage detection module, being configured to detect the input voltage of the corresponding power source;
a power information providing module, being configured to provide the output power information of the corresponding power supplier;
a current amplification module, being electrically connected with the voltage detection module, the power information providing module and the bus, and being configured to:
 detect the output current of the corresponding power supplier; and
 generate the voltage conversion signal according to a power gain converted from the output power information of the corresponding power supplier, another power gain converted from the detected input voltage, and the output current of the corresponding power supplier; and
 a voltage adjustment module, being electrically connected with the current amplification module and the bus, and being configured to:
  detect the output voltage provided to the load by the corresponding power supplier;
  receive the other voltage conversion signals generated by the other current equalizers of the power suppliers through the bus; and
  generate the voltage adjustment signal according to the detected output voltage, the voltage conversion signal generated by the current amplification module and the other voltage conversion signals generated by the other current equalizers of the power suppliers.

5. The power supplying system according to claim 4, wherein input voltages of the power sources are different.

6. The power supplying system according to claim 1, wherein output powers of the power suppliers are different.

7. The power supplying system according to claim 1, wherein a sum of output powers of the power suppliers is greater than a power required by the load.

8. A power supply adjustment method, being suitable for a power supplying system, the power supplying system including a plurality of power suppliers, the power suppliers being connected to a plurality of power sources respectively and being connected to a load and a bus together, each of the power suppliers including a current equalizer and a voltage converter, the power supply adjustment method including:

generating, by each current equalizer, a voltage conversion signal according to at least an output power information and an output current of the corresponding power supplier;

transmitting, by each current equalizer, the voltage conversion signal to other current equalizers through the bus;

receiving, by the bus, other voltage conversion signals generated by other current equalizers;

generating, by each current equalizer, a voltage adjustment signal according to the voltage conversion signal generated by the current equalizer, the other voltage conversion signals generated by the other current equalizers, and an output voltage provided to the load by the corresponding power supplier; and adjusting, by each voltage converter, an input voltage of the corresponding power source according to the voltage adjustment signal.

9. The power supply adjustment method according to claim 8, wherein each current equalizer generates the voltage conversion signal according to the input voltage of the corresponding power source, the output power information of the corresponding power supplier, and the output current of the corresponding power supplier.

10. The power supply adjustment method according to claim 9, wherein input voltages of the power sources are different.

11. The power supply adjustment method according to claim 8, wherein output powers of the power suppliers are different.

12. The power supply adjustment method according to claim 8, wherein a sum of rated output powers of the power suppliers is greater than a power required by the load.

* * * * *